US006285889B1

(12) United States Patent
Nykänen et al.

(10) Patent No.: US 6,285,889 B1
(45) Date of Patent: *Sep. 4, 2001

(54) INFORMATION OUTPUT SYSTEM, METHOD FOR OUTPUTTING INFORMATION AND TERMINAL DEVICES FOR OUTPUTTING INFORMATION VIA MOBILE COMMUNICATION NETWORK

(75) Inventors: Petri Nykänen; Lasse Siitonen, both of Tampere (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,557

(22) Filed: Aug. 4, 1997

(30) Foreign Application Priority Data

Aug. 8, 1996 (FI) ........................................................ 963116

(51) Int. Cl.[7] ....................................................... H04Q 7/20
(52) U.S. Cl. ......................... 455/557; 455/517; 455/414; 455/466
(58) Field of Search .................................. 455/517, 557, 455/422, 554, 457, 403, 414, 466, 556; 395/200.57; 358/448

(56) References Cited

U.S. PATENT DOCUMENTS

| 5,041,918 | | 8/1991 | Ishida et al. ........................... 358/442 |
| 5,175,762 | | 12/1992 | Kochis et al. ......................... 379/100 |
| 5,732,074 | * | 3/1998 | Spaur et al. ....................... 455/457 X |
| 5,809,415 | * | 9/1998 | Rossmann .............................. 455/422 |
| 5,848,413 | * | 12/1998 | Wolff ................................ 358/448 X |
| 5,867,661 | * | 2/1999 | Bittinger et al. ................ 395/200.57 |
| 6,055,441 | * | 4/2000 | Wieand et al. ....................... 455/557 |

FOREIGN PATENT DOCUMENTS

| 0 538 059 | 4/1993 | (EP) . |
| 0 574 222 | 12/1993 | (EP) . |
| WO 95/03669 | 2/1995 | (WO) . |

* cited by examiner

Primary Examiner—William Trost
Assistant Examiner—Philip J. Sobutka
(74) Attorney, Agent, or Firm—Perman & Green LLP (57) ABSTRACT

In an information output system according to the invention data (48) processed by an application (40) is processed in a terminal device (10) into a data transfer format (44) independent of the application (40) using a specific format generator (42). After this the data (48) is transferred to a second terminal device (20) via mobile communication network. In the receiving terminal device a specific data transfer application decodes the data (48) in the independent data format (44) into a form suitable for the output devices, and automatically transfers it to the output devices for outputting.

15 Claims, 6 Drawing Sheets

INFORMATION OUTPUT SYSTEM, METHOD FOR OUTPUTTING INFORMATION AND TERMINAL DEVICES FOR OUTPUTTING INFORMATION VIA MOBILE COMMUNICATION NETWORK

FIELD OF THE INVENTION

The present invention relates to a method for outputting information, in which data is transferred between a first terminal device and a second terminal device via mobile communication network, and in which first terminal device an application is used, the data processed by which is converted into a form suitable for the data transfer connection and is transferred to a second terminal device, in which the data is received and processed into a form suitable for outputting devices for outputting.

BACKGROUND OF THE INVENTION

In the modern information society people are more and more dependent on telecommunication and data processing services. Utilization of services has been experienced to be so important that people do no more want to be dependent on the limitations of traditional office environment. That is why many kinds of portable telecommunication terminal devices have been developed, a very popular representant of which is a portable microcomputer. In order to utilize various telecommunication services a portable microcomputer can, using auxiliary devices, be connected to telecommunication networks e.g. utilizing the data channel provided by GSM (Global System for Mobile Communications) -mobile telephone system. Telecommunication terminal devices slightly different in their functions are so called electronic notebooks, which are commonly called PDA (Personal Digital Assistant) -devices. These devices offer typically calendar services and other services increasing the efficiency of utilization of time.

A telecommunication terminal device which is even more advanced than the above mentioned ones is a so called multi-service mobile station. In a multi-service mobile station features have been collected from a portable microcomputer, a mobile station and a PDA-device. A multi-service mobile station is a small but versatile wireless telecommunication terminal device. This kind of device can be used as a mobile station, because it comprises e.g. the functions of a GSM mobile telephone, and with it one can send and receive facsimile messages, browse WWW (World Wide Web) -pages through Internet and create and edit text files. One example of this kind of multi-service mobile station is NOKIA 9000 Communicator manufactured by Nokia Mobile Phones Inc. All above mentioned devices have been optimized for a certain purpose, and they facilitate the utilization of various telecommunication and data processing services outside the office.

While using the above described telecommunication terminal devices one usually meets the following problem: one wishes to output information processed with the telecommunication terminal device on paper. While moving outside an office, a personal printer is not available very often. In order to be able to connect a telecommunication terminal device to a printer, a printer driver specific to the printer in question is required, which driver converts the data processed with the telecommunication terminal device into a form suitable for the printer. This means in practice that several different printer drivers have to be installed in a telecommunication terminal device in order to be able to use printers of different types. This can be somewhat successfully done in a portable computer which has a big mass storage. As is generally known, computers usually have a large number of printer drivers for various printers. Still, even then one may meet the problem that the necessary printer driver is not found in the mass memory of the computer when it is needed. This happens especially in foreign environment when it is impossible to predetermine an available printer. The version of an available printer driver can also be so old that printing is not successful when a more recent printer version is used. These problems are easily met e.g. while traveling, when one attempts to connect a computer to such a printer which one has not used previously.

Several printer drivers as such are a big problem for pocket-size, light telecommunication terminal devices. Their memory capacity is small, and as big a share of the available memory as possible is desired to be reserved for the information processed by the user. In addition to that, increasing memory capacity increases manufacturing cost. On the other hand, if memory capacity has to be increased because of the number of printer drivers, the power consumption of the memory is normally increased, and through it also the total power consumption of the telecommunication terminal device, which on its behalf has an unfavorable effect on the operating time of battery powered telecommunication terminal devices.

Patent publication U.S. Pat. No. 5,041,918 describes a separate adapter unit connected to a fixed ISDN (Integrated Services digital Network) -line, which adapter is further connected to a computer and a printer. The adapter unit comprises among other things ISDN -interface circuits, a memory and a processor. By utilizing this adapter unit it is possible to use a computer and a printer as a facsimile device. The adapter unit can relay transfer data received from the computer through ISDN-network to another corresponding adapter unit, and from there further to a printer. The information may be a teletext, a facsimile message and in so called mixed form, which comprises text and pictures. If information is transferred using a protocol other than the data transfer protocol prior known from facsimile devices, we meet the following drawback: one has to determine in advance for each connection which data format is to be used for data transfer. For example, if the receiving terminal device cannot process data in mixed form, the sending terminal device has to be commanded manually into facsimile mode.

Patent publication U.S. Pat. No. 5,175,762 presents a remote outputting method which utilizes in a data transfer connection through telephone lines the picture coding standard prior known from normal facsimile devices. Printer commands required for outputting have though to be forwarded in connection with the message, which means that one has to know before transmitting, what kind of printer is available in the other end. This is laborious. In addition to that, the resolution used in facsimile devices does not make it possible to transfer pictures of good quality. In the system according to the publication it is also possible to transfer data in non-standard (NSF, Non-Standard Facility) format. NSF has been specified in Group 3 of CCITT. In this case files can be transferred in the original file format, specific to each application. The disadvantage of this system is that outputting requires that the receiving end has access to the same software with which the file was originally created in the transmitting end. It is often even required that the software must be of the same version. Even if both computers would have the same software, the outputting has to be executed manually, that is, someone must be present in the receiving end to open the received file using said software and to give the Print-command.

SUMMARY OF THE INVENTION

Now an information outputting system utilizing a data transfer format independent of an application and an output device, and a telecommunication terminal devices have been invented, with which the above mentioned problems can be reduced. In the information output system according to the invention data intended for outputting is transferred between two telecommunication terminal devices or between a telecommunication terminal device and an output device. Telecommunication terminal devices may be either portable or fixed. The telecommunication terminal devices can be connected to a telecommunication network through wired connection or the connection is established wirelessly using either a radio connection or an infrared connection. Most preferably the benefits of the information output system according to the invention become evident while transferring data by radio from a portable telecommunication terminal device to a fixed telecommunication terminal device connected to an output device. Because of clarity and simplicity in the following one telecommunication terminal device is called portable terminal device and the other is called fixed device.

In the information output system according to the invention the information (data) from portable terminal device desired to be output is first converted into a data transfer format independent of application, which format is also independent of the physical realization of the data outputting system. After this the data desired to be output is transferred in the data transfer format independent of application from the portable terminal device to a fixed device connected to the desired telecommunication network, e.g. to a personal computer.

In order to execute the outputting the processor of the fixed device runs a device-independent data transfer program. The purpose of the data transfer program is to forward the data further for outputting. The transfer program recognizes that the received data is in the application-independent data transfer format e.g. from an output code added in the transferred data. It is also possible to define an individual data address for the application-independent data transfer format, in which case the transfer program automatically assumes that data coming from this address is in said application-independent data transfer format. In this case there is no need in the transmitting end to add any additional outputting code in the data to be transferred. Having received the data in the application-independent data transfer format, the transfer program decodes it into a format suitable for operating system and the output device. The output device can be, e.g., a monitor or a printer. If it is a printer the transfer program directs the decoded data further to the printer driver, from which it is further transferred to the printer controlled by the operating system. Depending on the type off the output device the data is transferred to the corresponding driver. The outputting from the fixed device to the output device takes place in a way similar to as if the data to be output would have been created in the fixed device. The printer driver and the output device do not even know that the data to be output is originated outside the fixed device. A difference with said patent publication U.S. Pat. No. 5,175,762 is among other things, that preferably the software with which the data was originally created in the portable terminal device, is not required in the fixed device.

Because the application-independent data transfer format used in connection with the data outputting system according to the invention is also hardware-independent, the one and same transfer program can preferably be used in all for outputting suitable fixed devices and networks, independent of the printer drivers or other drivers of the output devices and independent of the types of output devices. For the same reason the types of available output devices need not be known even when the transfer program is installed in a fixed device. The transfer program can preferably be installed in the fixed device from a diskette, but is also possible to install it through the telecommunication network. If the outputting device selected for use understands said independent data transfer format, the desired data can be transferred in the information output system according to the invention in the application-independent data transfer format from the portable terminal device directly to the output device.

The transfer of the application-independent data transfer format from a portable terminal device to an output device or to a fixed device connected to the same telecommunication network with the output device can preferably be carried out by radio, using data transfer over an infrared connection, or over a wire connection. It is possible to realize the wire connection using optical fiber or a cable providing galvanic connection.

The information output system according to the invention is characterized in, that the data conversion means of a first terminal device comprise a format generator which has been arranged to process the data to be transmitted into an application-independent data transfer format, means of data transmission have been arranged to transfer data in said independent data transfer format to another terminal device, the other terminal device comprises means for format decoding, which have been arranged to decode the data in said independent data transfer format into a form suitable for data outputting devices for outputting.

It is characteristic of the method for outputting information according to the invention, that for data transfer the data is processed into a data transfer format which is independent of application and outputting devices.

The information output system according to the invention utilizing application-independent data transfer format is described in detail in the following referring to enclosed figures.

DETAILED DESCRIPTION OF THE INVENTION

In the following the information output system according to the invention is explained using some preferable embodiments. However, nothing limits using the invention also in other systems different in their realization but belonging to the scope of the invention.

Figure 1:
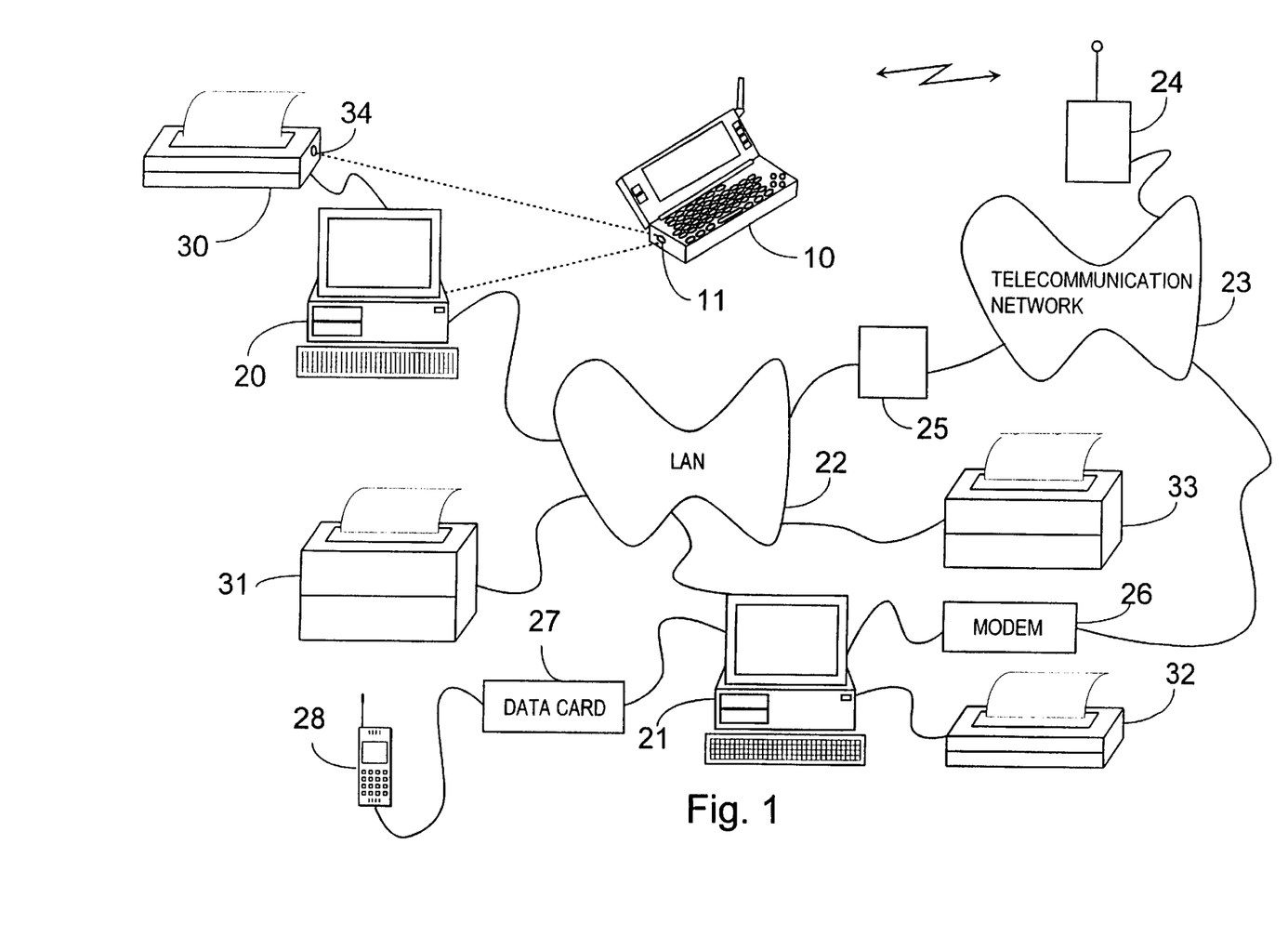
FIG. 1 presents an information output system according to the invention utilizing an application-independent data transfer format.

FIG. 1 presents a preferable information output system according to the invention utilizing application-independent data transfer format. It comprises portable terminal device 10, which is connected to a telecommunication network, in this case local network 22. A typical and very common local network 22 is the LAN (Local Area Network) -network. In FIG. 1 two computers 20, 21 and two printers 31, 33 have been connected to local network 22. Fixed devices connected to local network 22, that is computers 20, 21 and outputting devices 31,33 can transfer data between each other. This e.g. makes it possible that computer 20 can, when required output data using both printer 31 and printer 33. Additionally, computers 20, 21 connected to the telecommunication system have been connected to personal printers 30, 32. These personal printers 30, 32 are used mainly only locally, but if required also the capacity of personal printers 30, 32 can be, as prior known, shared between all computers 20, 21 connected to the local network, as e.g. in Microsoft Windows for Workgroups environment.

Portable terminal device 10 is connected to local network 22 e.g. utilizing data transfer over infrared connection between infrared transceiver element 11 installed in portable terminal device 10 and an infrared transceiver element (not shown in the figure) installed in computer 20. Alternatively the connection can be realized also over an optical or galvanic wire connection. When portable terminal device 10 is connected to local network 22 through computer 20, all printers 31, 33 connected to local network 22 are available for portable terminal device 10. If desired, it is also possible to execute the outputting using personal printers 30. The outputting can also be successfully carried out using printer 32, provided that the resources of printer 32 have been set to be shared between other computers 20 connected to the local network and that both computer 21 and printer 32 are ready for operation.

In the information output system according to the invention utilizing application-independent data transfer format 44, portable terminal device 10 need preferably not know the types of printers 31, 33 connected to local network 22 nor the types of personal printers 30, 32 connected to computers 20, 21. For this reason no printer drivers are needed in portable terminal device 10 and the settings of portable terminal device 10 need not be changed while selecting printer 30, 31, 32, 33. The printer selection is executed in computer 20 connected to the local network, in which computer 20 the selection is carried out by data transfer program 55 (see FIGS. 3A and 3B) installed in computer 20. The default printer of the computer can preferably be used as a printer, in which case data transfer program 55 need not select a printer. If for example a video monitor or a video projector is used as a output device instead of a printer, the settings are made in a similar manner under the control of computer 20 independently of the portable terminal device 10. Data transfer program 55, its functions, and application-independent data transfer format 44, utilized by data transfer program 55, are described in more detail in connection with the explanation of FIGS. 2A, 2B, 3A and 3B.

When an infrared connection or a physical wire connection is used, a high transfer speed can be used in the transfer connection in order to make the outputting faster. If portable terminal device 10 is used outside office, the outputting is carried out wirelessly using a radio connection. This is one of the most preferable fields of use of the invention. An example of a wireless data transfer method is the data channel of the GSM (Global System for Mobile Communications) mobile communication system prior known to a person skilled in the art. In order to establish a data transfer connection from portable terminal device 10 through base station 24 and telecommunication network 23 to local network 22 it is prior known to arrange adapter 25 between telecommunication network 23 and local network 22. A data transfer connection realized using local network 22 and adapter 25 also enables high speed data transfer to other networks. This type of realization is particularly suitable for large companies which need high data transfer capacity and several simultaneous data transfer connections.

If computer 21 is equipped with modem 26, portable terminal device 10 can be connected directly to computer 21 without local network 22 and adapter 25. In this case portable terminal device 10 opens a radio connection to base station 24, which is connected to telecommunication network 23. The connection from telecommunication network 23 to computer 21 is established over modem 26 using conventional telephone lines. It is evident to a person skilled in the art that establishing a connection from computer 21 to portable terminal device 10 takes place according to the same principle but in reversed order. A connection over modem 26 is an easy and economical way to realize and it is particularly suitable for private users and small enterprises. Using the same modem 26, computer 21 can be connected to also other telecommunication networks, such as Internet, according to the same principle. Modem 26 can also be a so-called card-modem, in which case it is installed inside computer 21. It is also possible to realize a connection from portable terminal device 10 to computer 21 directly over radio connection without modem 26 and telecommunication network 23. This can be realized in such a way that computer 21 is equipped with data card 27, which is connected to its PCMCIA (Personal Computer Memory Card International Association) -bus, and a mobile station 28. In this case it is possible to realize the data connection from portable terminal device 10 to mobile station 28 using e.g. the above mentioned data channel provided by the GSM-system.

Figure 2A:
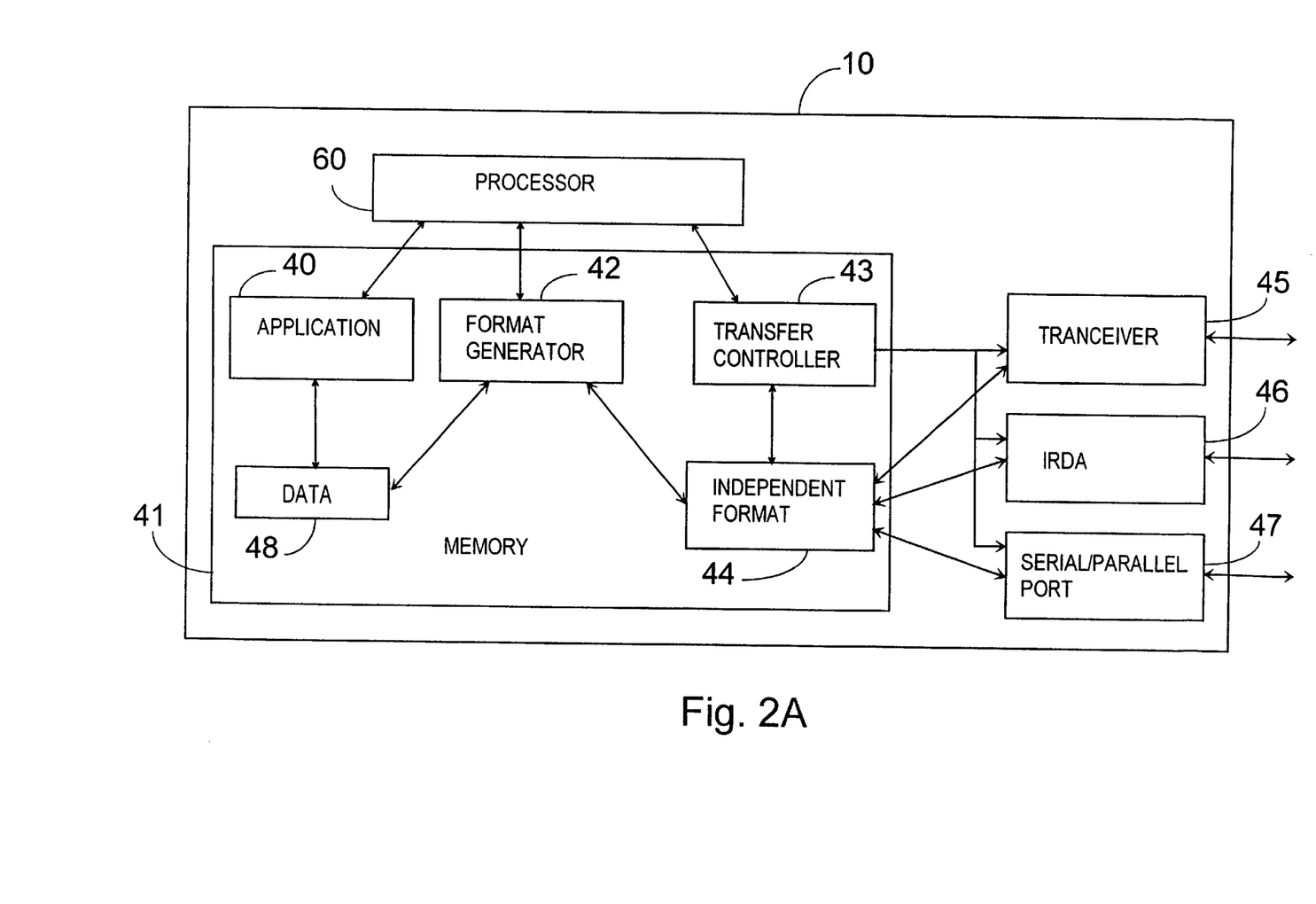
FIG. 2A presents an embodiment of a portable terminal device according to the invention utilizing an application-independent data transfer format, in form of a block diagram.

FIG. 2A presents the structure of portable terminal device 10 according to the invention utilizing application-independent data transfer format 44, in form of a block diagram. Portable terminal device 10 comprises at least one application 40. Application 40, as well as even eventual other applications, has been stored in form of programs in memory 41 of portable terminal device 10. Application 40 may be e.g. a word processing application, a facsimile service or an Internet-service. Processor 60 of portable terminal device 10 handles and processes data 48 of application 40, which data is in a form characteristic of application 40, in memory 41 of portable terminal device 10. If there are several applications 40, e.g. a word processing program, a facsimile service, a figure drawing application or an Internet-service, data 48 stored in memory 41 by each application 40 is not necessarily in the same form, or format. The reason of the differences between the formats is e.g. the accuracy or resolution used by application 40 when saving text or figures, or whether application 40 saves data 48 in text format (e.g. as standard ASCII-characters, in which case each character is represented by eight bits) or in a form characteristic of application 40, e.g. in binary form.

An essential component of the data transfer system according to the invention utilizing application-independent data transfer format 44 is format generator 42. It is possible to realize it e.g. utilizing a program stored in memory 41 of portable terminal device 10, which program is executed by processor 60. Format generator program 42 can be built-in in portable terminal device 10, but preferably it can also be installed afterward e.g. from a diskette, if the operating system of portable terminal device 10 and the structural realization facilitate it. Format generator 42 converts data 48 in original format characteristic of application 40 into format 44 which is independent of application 40, which is here also called independent format 44 for shortness.

In format generator 42 the conversion from one format to the other is carried out using mathematical methods, which are characteristic of each data format. In the following an example of format conversion is described, in which a circle presented in mathematical form is converted into a bit map. It has to be emphasized that the structure of independent format 44 decides which is the preferable method of executing the format conversion. The conversion into a bit map need not be carried out often.

In the beginning the necessary part of two-dimensional memory space is reserved, in which part the bits of bit map to be generated are saved. The size of the picture page to be output, the resolution used in data transfer and the number of colors used determine the size of the memory space required. Let us assume for the sake of simplicity that the figure is black and white, and that logical "0" corresponds to white, and that logical "1" corresponds to black. To begin with, all bits of the required part of two-dimensional memory space are set to "0" corresponding a white picture element. If the original circle has been presented utilizing the coordinates of the center, the radius of the circle and line thickness, the conversion into a bit map is started at the center point. The coordinates of the center correspond with a certain memory block of the two-dimensional memory space, in this case one memory bit. By calculating two-dimensionally with sufficient calculation accuracy the distance in bits indicated by the radius, from the memory bit corresponding with the center of the circle to every direction, and by setting the nearest bits to "1" corresponding with black, the circle can be converted into a bit map. Using this method, the thickness of the circumference would be only approximately one bit (corresponds typically to one picture element or pixel when displayed on a screen), and accordingly with bigger line thickness several adjoining bits at the circumference are set to "1", that is black. The above format conversion is an example of the mathematical method, prior known to a person skilled in the art, by which information presented in a digital form can be transferred from one format into another.

If format generator 42 is capable of directly handling data 48, application 40 need not necessarily participate in the processing of data 48 at all. This is the case e.g. when a file desired to be output is directly in form of a WMF (Windows Meta File) file according to Windows-environment. Application 40 need not in this case even be activated, but format generator 42 retrieves the WMF-file desired to be transferred directly from memory 41.

In many cases format generator 42 is not capable of converting data 48 specific to application 40 directly to application-independent format 44. This is due to the fact that most computer programs use for data saving a format specific of the application (proprietary), which format other computer programs cannot decode. In this case application 40 first carries out the conversion of data 48 specific of application 40 into a form suitable for format generator 42, and processor 60 forwards the data to format generator 42. There can be several of these data formats suitable for format generator 42, for example WMF- and BMP- (bitmap) formats prior known from Windows-environment. Because processor 60 preferably carries out the functions of both application 40 and of format generator 42, transfer of information between these two programs can be arranged effectively independent of the format.

Independent format 44 presents data 48 in such a form that in fixed device 20 (FIG. 3A) receiving independent format 44, independent of output devices such as printers 30, 31, monitors and their corresponding drivers 56, 57, data 48 can be decoded and further forwarded to the output devices. As an example of an output device in the following we use printers 30 and 31. The outputting using printers 30 and 31 has been achieved in such a way that data transfer program 55 executed by processor 62 of fixed device 20 converts independent format 44 into a format suitable for printer drivers 56, 57 for outputting. The conversion of data from one format into another itself is carried out applying mathematical methods corresponding with methods described above in connection with the explanation of format generator 42.

Suitable formats for printer drivers 56, 57 in the receiving end are e.g. the same WMF- and BMP-formats which can be used for data transfer in the transmitting end. The functions of format generator 42 and data transfer program 55 and outputting are described in more detail in the latter part of the specification. Both the transmitting and the receiving device have data transfer controllers 43 and 54 (FIGS. 2A and 3A) which together with processors 60 and 62 control data transfer between portable terminal device 10 and fixed device 20. This information output system according to the invention utilizing independent format 44 has in its preferable embodiment access to three separate data transfer paths. Controlled by processor 60 of portable terminal device 10, transfer controller 43 selects, if desired, for transfer path a radio channel, in which case data transfer from portable terminal device 10 to fixed device 20 takes place utilizing transceivers 45 and 51. Transceivers 45 and 51 have been realized e.g. using radio components prior known from GSM mobile telephones. Transceiver 45 of portable terminal device 10 comprises in this case also the means of modulation required for GSM-data transfer.

Figure 3A:
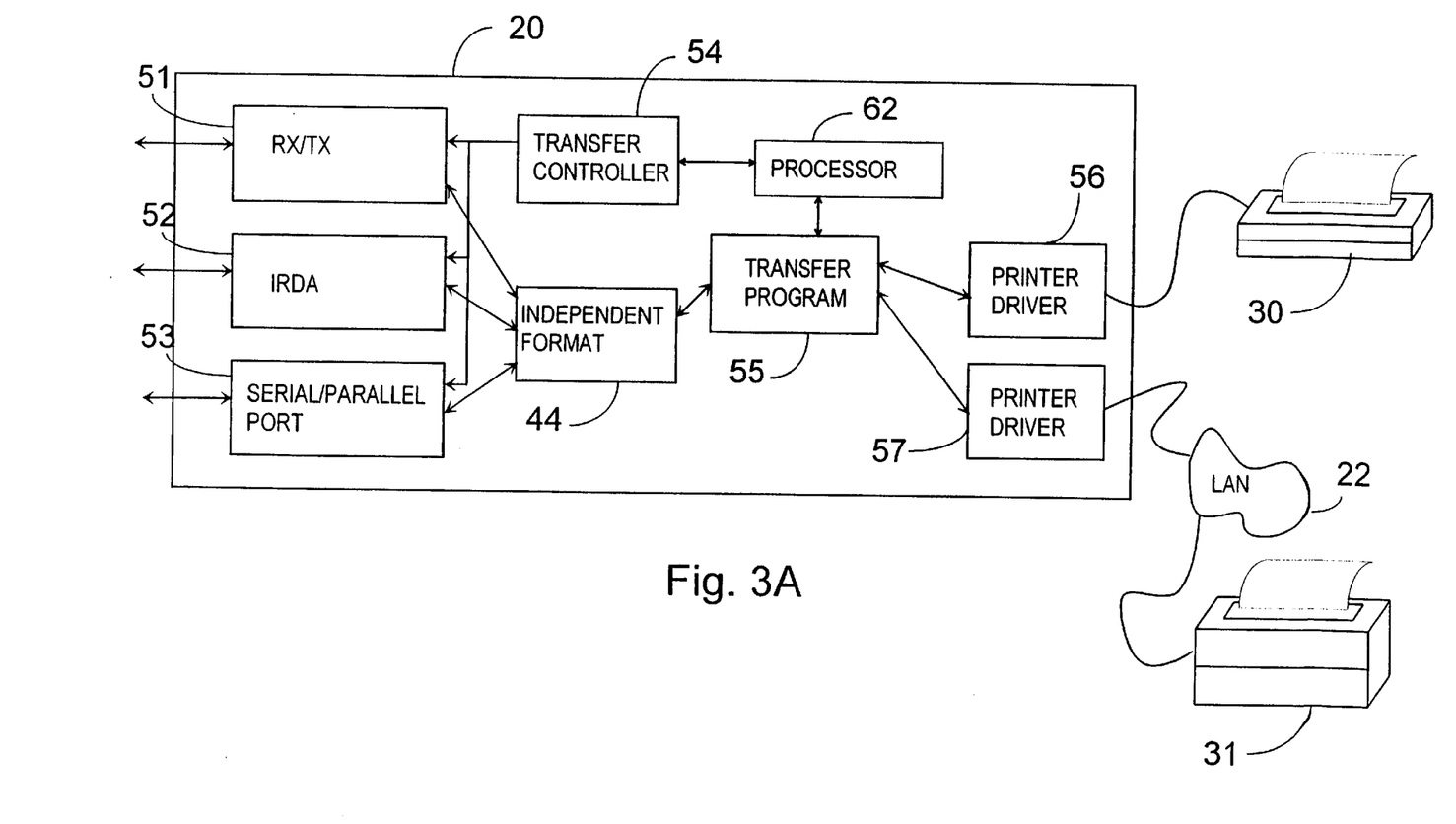
FIG. 3A presents the structure of a terminal device according to the invention utilizing an application-independent data transfer format and connected to telecommunication network and outputting devices, in form of a block diagram.

Correspondingly, data transfer over infrared connection is provided for by infrared transceiver 46 and infrared transceiver 52. Data transfer takes place e.g. using the IrDA-protocol of Infrared Data Association prior known to a person skilled in the art. If portable terminal device 10 and fixed device 20 have been connected using a physical wire connection, the data transfer is executed by data transfer controllers 43 and 54 utilizing preferably serial or parallel port 47 and serial or parallel port 53.

Figure 2B:
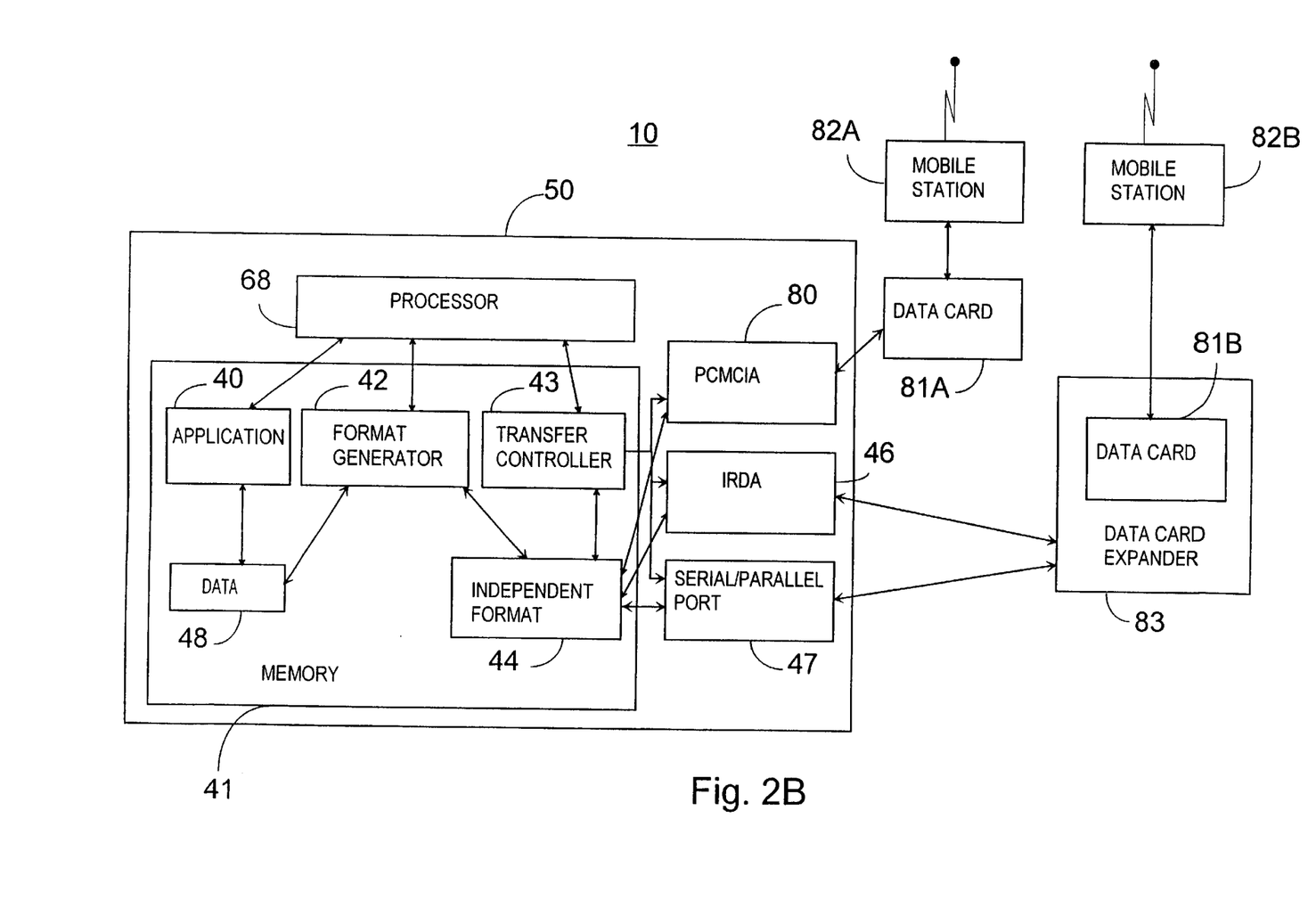
FIG. 2B presents another embodiment of a portable terminal device according to the invention utilizing an application-independent data transfer format, in form of a block diagram.

FIG. 2B presents another embodiment of the portable terminal device 10 according to the invention utilizing independent data transfer format 44. In it portable terminal device 10 comprises portable computer 50, data card 81A connected to its PCMCIA (Personal Computer Memory Card International Association) -bus and conventional mobile station 82A. Alternatively is possible to use, instead of a portable computer, a traditional desktop computer, if it is equipped with PCMCIA-bus 80. The conversion of data 48 handled by application 40 executed with processor 68 of the portable computer into independent format 44 is carried out as described in above chapters. A major difference with the embodiment presented in FIG. 2A is that the radio components are not fixedly incorporated in portable terminal device 10. When in the embodiment according to the invention presented in FIG. 2B data is transmitted in independent format 44 by radio, it preferably is carried out utilizing data card 81A connected to PCMCIA-bus 80 of portable computer 50. Data card 81A comprises among other things the data transfer protocols for transferring data between computer 50 and mobile station 82A. Data card 81A and mobile station 82A are connected together with an interface cable. Alternatively data card 81A to be connected to the PCMCIA-bus can be replaced with a particular radio module connected to the PCMCIA-bus, in which module the functions of data card 81A and mobile station 82A have been integrated in one module in order to save space and power.

If portable computer 50 does not have PCMCIA-bus 80 suitable for data card 81A or if the bus is already occupied, the data connection can also be realized using infrared connection 46 or e.g. serial/parallel port 47. In this case data card expander 83 will be required between portable computer 50 and data card 81B. Data card expander 83 is connected to portable computer 50 either using infrared connection 46 or using an interconnection cable to serial/parallel port 47. Data card expander 83 can be connected to data card 81B and mobile station 82B e.g. directly using connectors (not shown in the figure). The data card expander converts data 48 transferred in independent format 44 from infrared connection 46 or from serial/parallel port 47 into a form suitable for data card 81B. From data card 81B the data is forwarded to mobile station 82B and further to base station 24, which was the case also in the alternative described in the previous chapter.

In one outputting system according to the invention, which is utilizing independent format 44, portable terminal 10 can be realized in such a way that format generator 42 presented in FIG. 2B is placed in specific data card 81A connected to PCMCIA-bus 80. It is possible to realize format generator 42 as a program installed in the memory of data card 81A (not shown in the figure), but it can be realized also integrated in an ASIC (Application Specific Integrated Circuit) -circuit. When data transfer over PCMCIA-bus 80 is carried out using a data transfer program which utilizes only API (Application Programming Interface) -commands characteristic of Windows environment and format generator 44 has been realized outside portable computer 50, transfer of data in independent format 44 can preferably be realized without needing to install separate format generator application program 42 in portable computer 50. In the most advanced systems the operating system is capable of automatically initializing a PCMCIA-card installed in a PCMCIA-card slot, and accordingly very easy installation is achieved using this method. If processing of data 48 into independent format 44 is carried out outside portable computer 50, processor 68 of the portable computer is preferable not loaded by it, and the capacity of processor 68 can be utilized for other purposes.

Figure 3B:
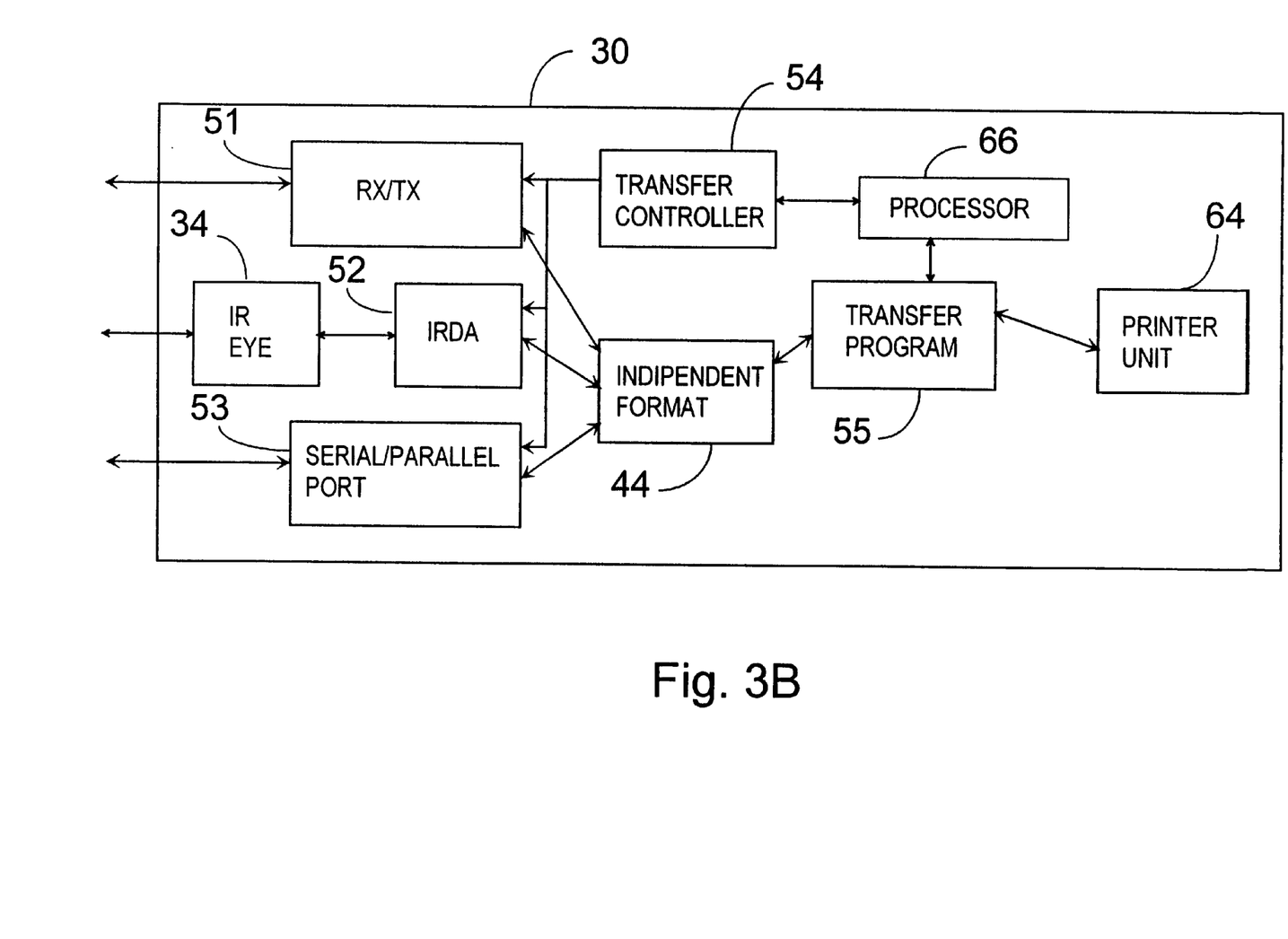
FIG. 3B presents the structure of an output device according to the invention utilizing an application-independent data transfer format and capable of directly outputting the application-independent data transfer format, in form of a block diagram.

FIG. 3B presents the realization of output device 30 according to the invention as a block diagram. Output device 30 is equipped with infrared transceiver 34, and accordingly it is capable of communicating with portable terminal device 10. Output device 30 can directly decode independent data transfer format 44, due to which computer 20 or local network 22 is preferably not needed. Processor 66 of output device 30 together with data transfer program 55 caters for decoding independent format 44 into a form suitable for output unit 64. The structure of output unit 64 is prior known to persons skilled in the art, e.g. from laser printers or inkjet printers, and it outputs the desired information e.g. on paper. Before transferring actual data 48 processed into independent format 44 in portable terminal device 10, portable terminal device 10 shown in FIGS. 2A and 2B and fixed devices 20 and 30 shown in FIGS. 3A and 3B can communicate with each other in order to determine the optimal parameters to be used at outputting. An example of communication between portable terminal 10 and fixed device 20, of using independent format 44, of using a direct outputting code, of transferring independent format 44, of decoding independent format 44 into a form suitable for printer drivers 56, 57, and of the outputting itself is described in detail in the following utilizing FIGS. 4 and 5. If no handshake operation alike the above described is carried out, both portable terminal device 10 and fixed devices 20 and 30 use default settings.

Figure 4:
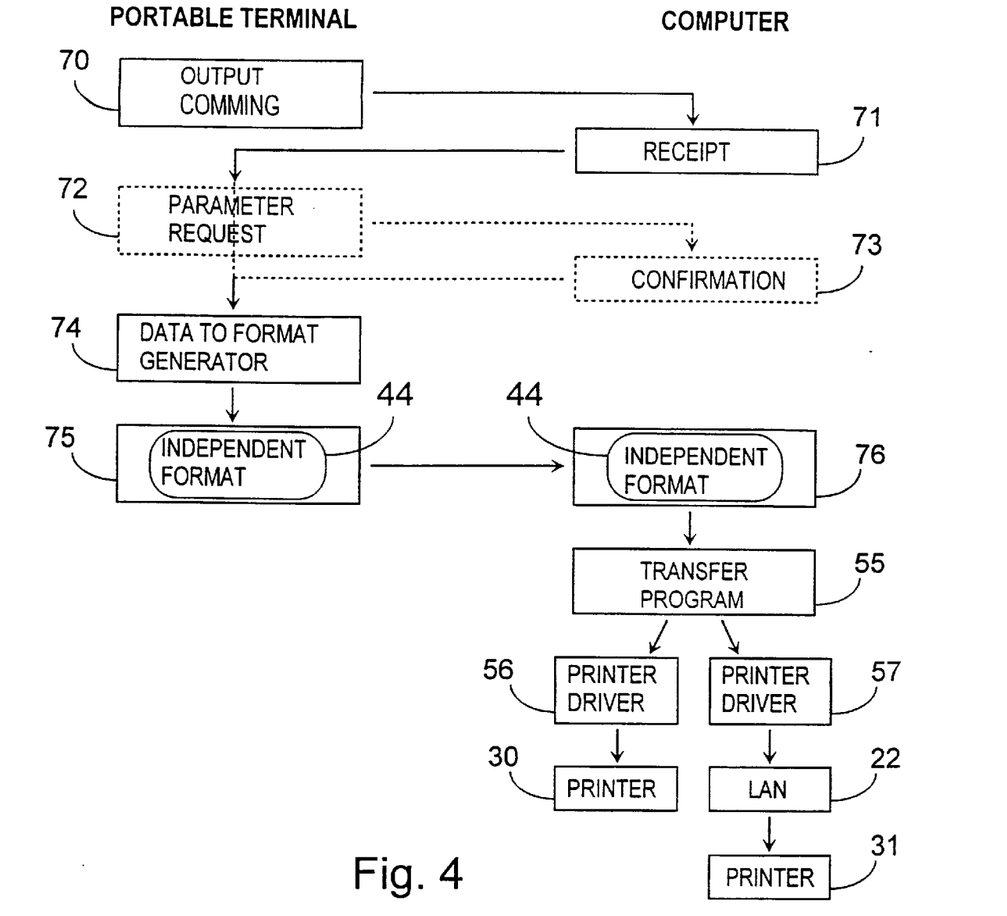
FIG. 4 presents an example of the communication between a portable terminal device and a fixed device according to the invention utilizing an application-independent data transfer format in connection with outputting.

In block "output coming" 70 processor 60 of portable terminal device 10 sends, using transfer path 45, 46, 47 used by data transfer controller 43, a message to fixed device 20, in which message it indicates that it wants to output to output device 30–33 of fixed device 20. Portable terminal device 10 needs preferably not to know anything about printers 30–33 themselves or about their settings. After receiving the message, processor 62 of fixed device 20 transmits acknowledgment message 71 to portable terminal device 10. Processor 62 of fixed device 20 can include in acknowledgment message 71 the parameters of the available printers, such as the resolutions of the printers, the available paper sizes, the paper position (horizontal or vertical) and the size of the largest printable picture area. Based upon this information portable terminal device 10 can, when it so wishes, select the printer to be used or alternatively use the default printer. This kind of exchange of information between two terminals, in order to agree on the parameters to be used in the connection, is prior known to a person skilled in the art e.g. from modems.

After receiving acknowledgment 71 processor 60 of portable terminal device 10 can send to fixed device 20 parameter request 72, in which it indicates which output device and which settings portable terminal device 10 wants fixed device 20 to use for outputting. If the settings included in acknowledgment message 71 correspond with the output settings of portable terminal device 10, parameter request 72 need preferably not be sent at all, but the processor of portable terminal device 10 can direct data 48 processed by application 40 directly to format generator 42 for processing. This takes place in block 74. If sending parameter request 72 was necessary, as e.g. when portable terminal device 10 wants to transmit using a resolution lower than what the output devices of fixed device 20 are capable of, fixed device 20 confirms the settings to be used with confirmation message 73. If any problems occur during the possible handshake procedure, terminal devices 10, 20 30 can be set in a state in which they after the elapse of a certain predetermined time constant operate at default settings. In this way outputting is possible even if the handshake operation was unsuccessful.

In block 74 format generator 42 processes data 48 handled by application 40 into independent format 44 utilizing processor 60. Such a format is selected as independent format 44, by use of which data transfer from portable terminal device 10 to fixed device 20 can be carried out as effectively as possible in current operating situation. As criteria for selection of independent format 44 can be used the amount of data to be transferred, the character of the information in data 48 or selected transfer path 45, 46, 47. Such a format shall be used in data transfer, which is limited to the output settings which are determined in accordance with above described blocks 70–73. In this way e.g. transfer of graphics information is done using the resolution facilitated by portable terminal device 10, if it is lower than the resolution of output device 30–33 selected by fixed device 20. Correspondingly, as a default value for data transfer the highest resolution facilitated by output device 30–33 is used if it is lower than the highest resolution facilitated by portable terminal device 10. In this way more transfer capacity cannot be reserved for data transfer than what is needed. If the amount of data to be transferred is large compared with available transfer capacity, which is in general the case when operating by radio, it is possible to decrease the resolution in order to increase the data transfer speeds and to lower the cost for data transfer. In this case naturally the quality of the transferred text, graphics and other information is reduced.

As independent format itself it is in principle possible to use any page description language. It is most essential from the point of view of the present invention that format generator 42 of portable terminal device 10 forms such independent format 44, which is decoded by data transfer program 55 of fixed device 20 into a form suitable for printer drivers 56, 57 (FIG. 3A) or output unit 64 (FIG. 3B). An independent format 44 suitable for the information output system according to the invention is, in addition to WMF- and BMP-formats, the HTML (Hyper Text Markup Language) page description language. HTML page description language has been defined according to ISO (International Standardizing Organization) - standard (ISO 8879,1986).

An essential part of page description languages is also the possibility to include separate pictures in the pages, which pictures have been coded using some other coding method, such as e.g. JPEG-compression method. JPEG (Joint Photographic Experts Group) is an ISO standard for encoding fixed pictures and it facilitates transferring large pictures of good quality utilizing data transfer band effectively. The compression ratio can be adjusted using picture quality as a criterion, and thus JPEG-standard is very versatile. JPEG is well suited for information output systems according to the invention utilizing independent data transfer format 44, in which systems the capacity available for data transfer can be very different in different operating situations: by radio in GSM-system it may be that only 9600 bit/s is available, whereas in infrared connections it is possible to use e.g. speeds 1.152 or 4 Mbit/s.

In the information output system according to the invention there can be several page description languages, in which case processor 60 of portable terminal device 10 selects for format generator 42 the page description language which is best suited for the current page intended to be output. This is preferable among other things because some of the page description languages are better suited for text dominated (e.g. HTML) and some for graphics (e.g. JPEG) -pages. As an example of other page description languages suitable for independent format 44 we mention HPGL (Hewlett-Packard Graphics Language) -language developed by Hewlett-Packard, which language has become a de-facto standard. HPGL-language has been designed for plotters, and thus it is well suited e.g. for pages which contain plenty of pictures consisting of thin lines. Another page description language, mainly suited for high transfer speeds because of the high volume of the information to be transferred, is EPS (Encapsulated Post Script).

Figure 5:
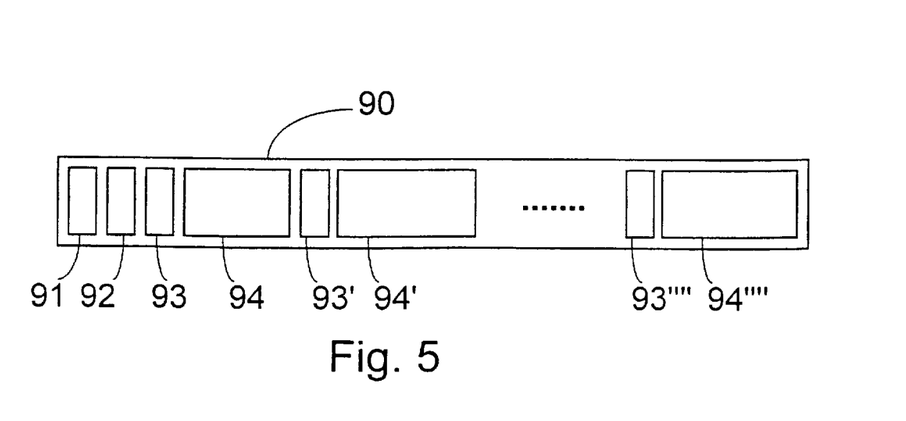
FIG. 5 presents an example of a transfer frame, in which data in an application-independent data transfer format can be transferred between terminal devices according to the invention.

In order to carry out data transfer from portable terminal device 10 to fixed device 20 format generator 42 places, if required, independent format 44 into transfer frame 90 (FIG. 5). If a specific port (e.g. a COM-port) in fixed device 20 has been allocated for data to be received in independent format 44, a transfer frame according to the following description is not necessarily needed, because that data is always automatically directed to the correct address. It is possible to include direct output code 91 in transfer frame 90. Based upon the information marked in direct output code 91, data transfer program 55 in fixed device 20 recognizes that data in independent format 44 is concerned and can act accordingly, that is to carry out the described conversions and transfer the received information directly to the output device. If so desired, an authorization for outputting can be requested from the operator e.g. using an inquiry window displayed on the computer screen. The data in independent format 42 has been placed in blocks 94–94"". Language identifiers 93–93"" are placed before the data blocks, which identifiers indicate which page description language is used in data blocks 94–94"". It is also possible to include in transfer frame 90 fault correction parameters 92, prior known to a person skilled in the art, for detection and/or correction of transfer errors. Error correction parameters can also be placed at the end of transfer frame 90 or after each data area 94–94"". Direct output code 91 preferably contains information of the name and size of the file to be transmitted, and the revision numbers of the various parts of the system. If the file to be transmitted consists of several transfer frames 90, also the numbers of the different frames are indicated in direct output code 91. The numbering can be utilized e.g. at transfer failure, in which case it is possible to request retransmission of only those transfer frames which contained errors.

In the next stage processor 60 selects a page description language suitable for the first page, e.g. HTML language. The identifier of the page description language is placed by processor 60 in language identifier 93 of data transfer frame 90. Now that format generator 42 has prepared the frames of data transfer frame 90, format generator 42 of portable terminal device 10 processes data 48 in application 40 into independent format 44, and places it in data transfer frame 90 in the place allocated to it, in data area 94. Processor 60 changes the page description language if necessary either between pages or even in the middle of a page, and while doing so, always generates a new language identifier 93', after which it again places the data generated with the page description language in data area 94'. When data transfer frame 90 is entirely ready, format generator 42 sets it ready in the data transfer path in block 75. The size and quantity of data transfer frames 90 is optimized according to the amount of data to be transferred and to the quality of the transfer connection in order to have the data transfer connection operating as efficiently and reliably as possible. Data transfer frame 90 can be realized in a number of ways, and using it is not even necessary in the data transfer system according to the invention.

In the next stage independent format 44 is transferred, controlled by processors 60 and 62 and data transfer controllers 43 and 54, in data transfer frames 90 from portable terminal device 10 to fixed device 20 using the selected transfer path 45, 46, 47. When data in independent format 44 is transferred directly to output device 30 (FIG. 3B), processor 66 of output device 30 is utilized correspondingly for the data transfer.

In fixed device 20 transfer program 55 decodes independent format 44 according to the requirements of operating system into a form suitable for printer drivers 56 or 57 and forwards the decoded data to the selected printer driver 56 or 57 for outputting. In the present data output system according to the invention utilizing independent data transfer format 44, data transfer program 55 has been realized in processor 62 of fixed device 20, which processor executes decoding and data transfer program code 55 stored in a memory (not shown in the figure). Processor 62 checks at regular intervals I/O (Input/Output) ports 51, 52,53 of fixed device 20 in order to find out if any data transferred in independent format 44 is coming. This so called polling takes place under the control of operating system. Respectively the data transfer program monitors regularly the result of said polling. Data transfer program 55 recognizes a file received in independent format 44 e.g. from the name of the received file or from direct outputting identifier 91 transferred in the data transfer frame. Depending on the operating system, the information of a file received in independent format 44 can be forwarded also using the message principle. In this case the operating system automatically generates a message, which tells that data in independent format 44 has been received, and transmits it to data transfer program 55. In this case data transfer program 55 preferably needs not actively to monitor the result of the polling executed by the operating system. If the Input/Output port used has been reserved exclusively for data transferred in independent format 44, there is no need to use a direct outputting identifier.

If e.g. Windows user environment is concerned, data transfer program 55 decodes independent format 44 into WMF (Windows Meta Format) -format. A special case occurs when WMF-format is used for independent format 44, in which case naturally no decoding is preferably needed. WMF-format is a general format prior known to a person skilled in the art, which is used in Windows environment e.g. for data transfer between different computer programs. It is just because of this that all printer drivers 56, 57 are capable of outputting text and picture files in WMF-format. WMF-format preferably facilitates transfer of high quality graphics, because WMF-format is not limited to a certain resolution in the same way as e.g. BMP (Bit Map) -format, which also could be used in the information output system according to the invention.

Before transferring the data decoded into WMF-format to printer driver 56, 57 processor 62 of fixed device 20 selects for use a desired printer driver 56, 57 based upon the printer driver data of the operating system, preferably the printer driver of the default printer. When printer driver 56, 57 has been selected, processor 62 transfers, controlled by data transfer program 55, the data decoded into WMF-format by itself to the selected printer driver, e.g. printer driver 56, which further transfers the data to output queue (not shown in the figure). The print queue is prior known to a person skilled in the art, e.g. the queue of FIFO (First In First Out) -type arranged by processor 62 in the memory (not shown in the figure) of fixed device 20, from where processor 62 of fixed device 20 further transfers the data to be output to output device 30. It is also possible to arrange the print queue in connection with computer 21 connected to local network 22, and also in output device 31 itself.

In the cases mentioned in the previous chapter the documents intended to be output are often output in the order they arrive in the print queue. It is also possible to change the printing order of the documents by giving the documents different priorities, in which case the documents classified as most urgent are printed first. When data transfer program 55 executed by processor 62 of fixed device 20 has transferred the documents to be printed to the print queue, printer 30–33 selected by fixed device 20 prints out the desired documents exactly alike in the case if the documents had been originally created and output in fixed device 20. It preferably makes no difference to printer driver 56, 57 and output devices 30–33 were the documents desired to be printed came from fixed device 20 or portable terminal device 10.

The information output system according to the invention solves the long known problem of outputting with almost any output device without the need for a output device dependent driver. With this method remarkably easy use is achieved and successful output can be trusted upon even in foreign environment. The invention is very useful particularly for portable terminal devices, which are often moved from one environment to another. They also have a limited memory capacity, which in the information output system according to the invention is released for effective use because printer drivers requiring plenty of memory space are preferably not needed any longer.

This has been a presentation of the realization of the invention and some of its embodiments using examples. It is evident to a person skilled in the art that the invention is not limited to the details of the above presented embodiments and that the invention can be realized also in other form without deviating from the characteristics of the present invention. The above presented examples should be regarded as illustrating, not as limiting. Thus the possibilities of realizing and using the invention are limited only by enclosed patent claims. Thus the various embodiments of the invention defined by the claims, including equivalent embodiments, are included in the scope of the invention.

What is claimed is:

1. An information transmission system for transmitting information from a mobile terminal device for printing at the receiving end, which system comprises:

a first terminal device, a second terminal device and means for establishing a data transfer connection between said first and second terminal devices, and in said first terminal device means for running an application, means for conversion of data processed by the application into a form suitable for said data transfer connection, and in said second terminal device means for receiving the data and in connection with said second terminal device means for automatically printing said data upon receiving the data in the second terminal device;

wherein said data conversion means of the first terminal device comprise a format generator which has been arranged to process the data to be transmitted into an application independent data transfer format, said data transmitting means have been arranged to establish the data transfer connection to the second terminal device, to generate a direct printing identifier, and to transfer the data in said independent data transfer format to said second terminal, and said second terminal device further comprises:

format decoding means which have been arranged to decode the data in said independent data transfer format into a form suitable for said data printing means for printing.

2. An information transmission system for printing, according to claim 1, wherein said format decoding means have been arranged to automatically decode the data in said independent data transfer format into a form suitable for said data outputting means for automatic output.

3. An information transmission system for printing, according to claim 1, wherein said data transmitting means and said data receiving means comprise at least one of the following means of data transfer: a radio transceiver, an infrared transceiver, a PCMCIA-bus, a serial port and a parallel port.

4. An information transmission system for printing, according to claim 1, wherein the information is printed via a mobile communication network, whereby the first terminal device comprises means for transmitting the data via said mobile communication network, the data transfer connection is via said mobile communication network, and the data is transferred in said independent data transfer format from said first terminal device to said second terminal device via said mobile communication network.

5. An information transmission system for printing, according to claim 1, wherein the first terminal device is a pocket-size mobile communication device.

6. A mobile terminal device which comprises means for running an application, means for converting data processed by the application into a form suitable for a data transfer connection, data transmitting means for transmitting the data, wherein said data converting means of the mobile terminal device comprise a format generator which has been arranged to process the data to be transmitted into a data transfer format independent of the application, and a direct printing identifier generator to generate a direct printing identifier, and said data transmitting means have been arranged to establish the data transfer connection to a second terminal device and to transfer the data in said independent data transfer format including said direct printing identifier to a second terminal device for automatic printing upon receiving the data in the second terminal device.

7. A terminal device according to claim 6, wherein said data transmitting means comprise at least one of the following means of data transfer: a radio transceiver, an infrared transceiver, a PCMCIA-bus, a serial port and a parallel port.

8. A terminal device according to claim 6, wherein said data transmitting means have been arranged to establish the data transfer connection to said second terminal device via a mobile communication network and to transfer the data in said independent data transfer format to said second terminal device via said mobile communication network.

9. A terminal device according to claim 6, wherein the terminal device is a pocket-size mobile communication device.

10. A method for printing information on a printing device from a first mobile terminal device, in which an application is used, wherein data processed by the application is processed into a form suitable for a data transfer connection, is established between the first mobile terminal device and a second terminal device, and further wherein, before transferring, the data is processed by the first terminal device into an application and printing device independent data transfer format having a direct printing identifier and at the second terminal device the received data is processed into a form suitable for printing devices and is transferred to the printing devices for automatic printing upon receiving the data in the second terminal device.

11. A method according to claim 10, wherein the information is printed via a mobile communication network, whereby the data transfer connection is via said mobile communication network, and the data is transferred in said independent data transfer format from said first terminal device to said second terminal device via said mobile communication network.

12. A method according to claim 10, wherein the first terminal device is a pocket-size mobile communication device.

13. An information transmission system for transmitting information from a mobile terminal for printing at the receiving end, which system comprises:

a mobile terminal device, a receiving terminal device and means for establishing a wireless data transfer connection between said mobile and receiving terminal devices, and in said mobile terminal device means for using printer driver application software resident on said receiving terminal device, means for conversion of data processed by the application into a form suitable for said wireless data transfer connection, and in said receiving terminal device means for receiving the data and in connection with said second terminal device means for automatically printing said data upon receiving the data in the receiving terminal device;

wherein said data conversion means of the mobile terminal device comprise a format generator which has been arranged to process the data to be transmitted into an application independent data transfer format, said data transmitting means have been arranged to establish the data transfer connection to the receiving terminal device and to transfer the data in said independent data transfer format to said receiving terminal, and said receiving terminal device further comprises format decoding means which have been arranged to decode the data in said independent data transfer format into a form suitable for said data printing means for printing.

14. An information transmission system for transmitting information from a mobile terminal for printing at the receiving end, which system comprises:

a first terminal device, a second terminal device and means for establishing a data transfer connection between said first and second terminal devices, and in said first terminal device means for running an application, means for conversion of data processed by the application into a form suitable for said data transfer connection, and in said second terminal device means for receiving the data and in connection with said second terminal device means for automatically printing said data upon receiving the data in the second terminal device;

wherein said data conversion means of the first terminal device comprise a format generator which has been arranged to process the data to be transmitted into an application independent data transfer format, said data transmitting means have been arranged to establish the data transfer connection to the second terminal device and to transfer the data in said independent data transfer format to said second terminal, and said second terminal device further comprises format decoding means which have been arranged to decode the data in said independent data transfer format into a form suitable for said data printing means for printing, and wherein said data transmitting means of the first terminal device have been arranged to transmit the data in the independent data transfer format in data transfer frames, and that said data conversion means have been arranged to add a direct print identifier in the data transfer frames.

15. A terminal device which comprises means for running an application, means for converting data processed by the application into a form suitable for a data transfer connection, data transmitting means for transmitting the data, wherein said data converting means of the terminal device comprise a format generator which has been arranged to process the data to be transmitted into a data transfer format independent of the application, and said data transmitting means have been arranged to establish the data transfer connection to a second terminal device and to transfer the data in said independent data transfer format to a second terminal device for automatic printing upon receiving the data in the second terminal device, and wherein said data transmitting means of the terminal device have been arranged to transmit the data in the independent data transfer format in data transfer frames, and that said data converting means have been arranged to add a direct printing identifier in the data transfer frames.

* * * * *